US010399498B2

United States Patent
Heintzelman et al.

(10) Patent No.: US 10,399,498 B2
(45) Date of Patent: Sep. 3, 2019

(54) ELECTRICAL CONNECTIONS FOR ELECTRO-OPTIC ELEMENTS

(71) Applicant: Gentex Corporation, Zeeland, MI (US)

(72) Inventors: Adam R. Heintzelman, Grand Rapids, MI (US); Juan C. Lara, Holland, MI (US); Christopher M. Derry, Allegan, MI (US); David J Cammenga, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/845,096

(22) Filed: Dec. 18, 2017

(65) Prior Publication Data

US 2018/0170263 A1 Jun. 21, 2018

Related U.S. Application Data

(60) Provisional application No. 62/435,922, filed on Dec. 19, 2016.

(51) Int. Cl.

| *B60R 1/062* | (2006.01) |
| *G02B 7/198* | (2006.01) |
| *B60R 1/08* | (2006.01) |
| *G02F 1/157* | (2006.01) |
| *G02F 1/163* | (2006.01) |
| *G09G 3/38* | (2006.01) |
| *G09G 3/34* | (2006.01) |
| *G02F 1/153* | (2006.01) |
| *G02F 1/161* | (2006.01) |
| *G02B 27/01* | (2006.01) |

(52) U.S. Cl.
CPC .............. *B60R 1/088* (2013.01); *G02B 27/01* (2013.01); *G02F 1/153* (2013.01); *G02F 1/157* (2013.01); *G02F 1/161* (2013.01); *G02F 1/163* (2013.01); *G09G 3/3406* (2013.01); *G09G 3/38* (2013.01); *B60R 1/062* (2013.01)

(58) Field of Classification Search
CPC .................................................... B60R 1/062
USPC ............................................................ 385/2
See application file for complete search history.

(56) References Cited

U.S. PATENT DOCUMENTS

| 8,988,756 B2 | 3/2015 | Agrawal et al. |
| 9,205,780 B2 | 12/2015 | Habibi et al. |
| 9,963,073 B1* | 5/2018 | Caraan .................... B60R 1/062 |
| 2004/0032638 A1 | 2/2004 | Tonar et al. |
| 2006/0225776 A1* | 10/2006 | Nemazi ................. H01L 31/048 |
| | | 136/244 |
| 2010/0200293 A1* | 8/2010 | Busick ..................... H05B 3/84 |
| | | 174/84 R |

(Continued)

*Primary Examiner* — Eric Wong
(74) *Attorney, Agent, or Firm* — Price Heneveld LLP; Bradley D. Johnson

(57) ABSTRACT

An electro-optic element of a display of a vehicle includes a first substantially transparent substrate defining a first surface and a second surface. A first edge extends around the first substrate. A second substantially transparent substrate defines a third surface and a fourth surface. A second edge extends around the second substrate. A primary seal is disposed between the first and second substrates. The seal and the first and second substrates define a cavity therebetween. At least one of the first and second edges is stepped proximate the seal to define a channel. An electro-optic material is positioned within the cavity.

17 Claims, 3 Drawing Sheets

(56) References Cited

U.S. PATENT DOCUMENTS

2016/0075284 A1\* 3/2016 Green .................. G02F 1/1339
359/245

\* cited by examiner

ELECTRICAL CONNECTIONS FOR ELECTRO-OPTIC ELEMENTS

CROSS-REFERENCE TO RELATED APPLICATION

This application claims priority to and the benefit under 35 U.S.C. § 119(e) of U.S. Provisional Patent Application No. 62/435,922, filed on Dec. 19, 2016, entitled ELECTRICAL CONNECTIONS FOR ELECTRO-OPTIC ELEMENTS, the entire disclosure of which is hereby incorporated herein by reference.

FIELD OF THE DISCLOSURE

The present disclosure generally relates to electro-optic elements, and more particularly, to electrical connections for electro-optic elements.

BACKGROUND OF THE DISCLOSURE

Electro-optic elements are being used in various vehicular and building applications, (e.g., within rearview display devices and variably transmissive windows). Use of these assemblies in various applications can be limited by cost, aesthetic and functional considerations. Accordingly, new electro-optic element designs, configurations and assemblies, along with methods of making them, are needed particularly in view of reducing material and processing costs, improving aesthetics and/or enhancing functionality.

SUMMARY OF THE DISCLOSURE

According to at least one feature of the present disclosure, an electro-optic element of a display of a vehicle includes a first substantially transparent substrate defining a first surface and a second surface. A first edge extends around the first substrate. A second substantially transparent substrate defines a third surface and a fourth surface. A second edge extends around the second substrate. A primary seal is disposed between the first and second substrates. The seal and the first and second substrates define a cavity therebetween. At least one of the first and second edges is stepped proximate the seal to define a channel. An electro-optic material is positioned within the cavity.

According to another feature of the present disclosure, an electro-optic element includes a first substantially transparent substrate defining a first surface and a second surface. A first edge extends around the first substrate. A second substantially transparent substrate defines a third surface and a fourth surface. A second edge extends around the second substrate. A primary seal is disposed between the first and second substrates. The seal and the first and second substrates define a cavity therebetween. The cavity has a thickness between the first and second substrates of less than about 75 µm and the second edge is stepped in an inboard direction to define a channel. An electro-optic material is positioned within the cavity.

According to another feature of the present disclosure, an electro-optic element includes a first substantially transparent substrate defining a first surface and a second surface. A first edge extends around the first substrate. A second substantially transparent substrate defines a third surface and a fourth surface. A second edge extends around the second substrate. The second edge is set inboard of the first edge to define a channel. A conductive bus is positioned within the channel. A primary seal is disposed between the first and second substrates. The seal and the first and second substrates define a cavity. An electro-optic material is positioned within the cavity.

These and other features, advantages, and objects of the present disclosure will be further understood and appreciated by those skilled in the art by reference to the following specification, claims, and appended drawings.

According to a first aspect, an electro-optic element of a display of a vehicle is provided that includes an electro-optic element of a display of a vehicle includes a first substantially transparent substrate defining a first surface and a second surface. A first edge extends around the first substrate. A second substantially transparent substrate defines a third surface and a fourth surface. A second edge extends around the second substrate. A primary seal is disposed between the first and second substrates. The seal and the first and second substrates define a cavity therebetween. At least one of the first and second edges is stepped proximate the seal to define a channel. An electro-optic material is positioned within the cavity.

According to a second aspect, the electro-optic element of aspect 1 is provided, wherein the second edge is stepped in an inboard direction to define the channel.

According to a third aspect, the electro-optic element of aspect 1 further comprises, an electrical bus positioned within the channel.

According to a fourth aspect, the electro-optic element of aspect 1 is provided, wherein both the first and second edges are stepped to define the channel.

According to a fifth aspect, the electro-optic element of aspect 4 further comprises, a first electrical bus positioned proximate the first stepped edge; and a second electrical bus positioned proximate the second stepped edge, wherein the first and second electrical buses are electrically isolated.

According to a sixth aspect, the electro-optic element of aspect 5, wherein the seal is positioned between the first and second electrical buses.

According to a seventh aspect, the electro-optic element of aspect 1, wherein the cavity has a spacing between about 20 µm and about 75 µm.

According to an eighth aspect of the electro-optic element of aspect 1, wherein an electrical connection extends into the channel, the electrical connection comprises a polymeric film with a metallic coating.

According to a ninth aspect of the electro-optic element of aspect 1, wherein an electrical connection extends into the channel and a thickness of the electrical connection is greater than a spacing of the cavity.

According to a tenth aspect, an electro-optic element is provided that includes a first substantially transparent substrate defining a first surface and a second surface. A first edge extends around the first substrate. A second substantially transparent substrate defines a third surface and a fourth surface. A second edge extends around the second substrate. A primary seal is disposed between the first and second substrates. The seal and the first and second substrates define a cavity therebetween. The cavity has a thickness between the first and second substrates of less than about 75 µm and the second edge is stepped in an inboard direction to define a channel. An electro-optic material is positioned within the cavity.

According to an eleventh aspect, the electro-optic element of aspect 10 further comprises a conductive bus positioned within the channel and extending substantially over the second edge.

According to a twelfth aspect, the electro-optic element of aspect 10 is provided, wherein the seal is positioned inboard of the channel.

According to a thirteenth aspect, the electro-optic element of aspect 12 is provided, wherein the channel is wider than it is tall.

According to a fourteenth aspect, the electro-optic element of aspect 12 is provided, wherein the channel is taller than it is wide.

According to a fifteenth aspect, the electro-optic element of aspect 10 is provided, wherein the electro-optic material is an electrochromic material.

According to a sixteenth aspect, the electro-optic element of aspect 10 is provided, wherein an electrical bus is positioned within the channel and extends substantially around the second substrate.

According to a seventeenth aspect, the electro-optic element of aspect 10 is provided, wherein the first edge is stepped in an inboard direction such that the channel is defined by the first and second stepped edges and an electrical bus substantially fills the channel.

According to an eighteenth aspect, the electro-optic element is provided that includes a first substantially transparent substrate defining a first surface and a second surface. A first edge extends around the first substrate. A second substantially transparent substrate defines a third surface and a fourth surface. A second edge extends around the second substrate. The second edge is set inboard of the first edge to define a channel. A conductive bus is positioned within the channel. A primary seal is disposed between the first and second substrates. The seal and the first and second substrates define a cavity. An electro-optic material is positioned within the cavity.

According to a nineteenth aspect, the electro-optic element of aspect 18 is provided, wherein the conductive bus defines a curved shape.

According to a twentieth aspect, the electro-optic element of aspect 19 is provided, wherein the conductive bus comprises a silver epoxy.

DETAILED DESCRIPTION OF EMBODIMENTS

Figure 1:
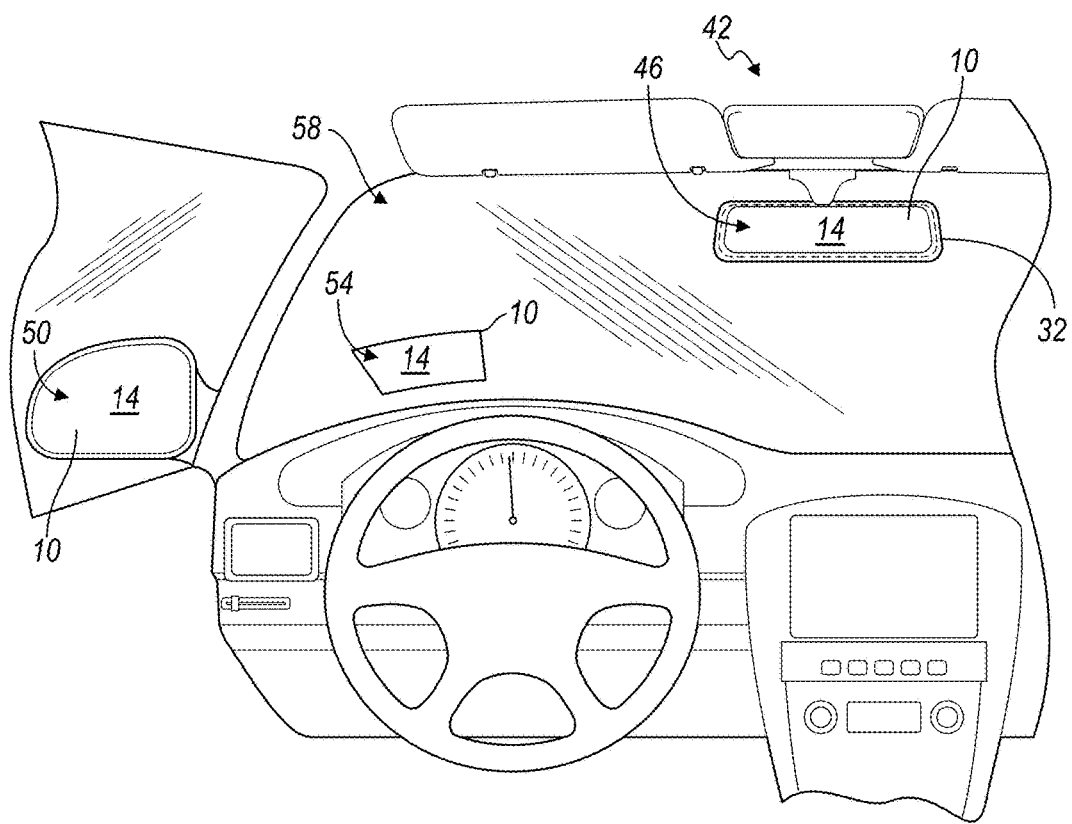
FIG. 1 is a perspective view of a passenger compartment of a vehicle including an electro-optic element, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIGS. 1-4, reference numeral 10 generally designates an electro-optic element 10. The electro-optic element 10 may be utilized in a display 14 of a vehicle. A first substantially transparent substrate 18 defines a first surface 18A and a second surface 18B. A first edge 18C extends around the first substrate 18. A second substantially transparent substrate 22 defines a third surface 22A and a fourth surface 22B. A second edge 22C extends around the second substrate 22. A primary seal 26 is disposed between the first and second substrates 18, 22. The seal 26 and the first and second substrates 18, 22 define a cavity 30 therebetween. At least one of the first and second edges 18C, 22C is stepped proximate the seal 26 to define a channel 34. An electro-optic material 38 is positioned within the cavity 30.

With regard to FIG. 1, the electro-optic element 10 may be included in various displays 14 for a vehicle 42. The display 14 may be implemented as an interior rearview display 46, a side-mirror display 50, and/or various other mirrored devices. Though discussed in reference to an automotive vehicle, the electro-optic element 10 and/or display 14 may be utilized for various applications including, but not limited to, transit vehicles, nautical vessels, aircraft, etc. In some examples, the electro-optic element 10 and/or display 14 may be implemented as a heads-up display 54, which may be affixed or laminated to a windscreen 58 of the vehicle 42. In such a configuration, the electro-optic element 10 discussed herein may be configured to be transitioned between substantially transparent and substantially darkened states. Such a configuration may be used to selectively control the transmittance of the electro-optic element 10 to control a contrast between the windscreen 58 and the display 14. Enhanced contrast may improve a visibility of image data and/or graphics displayed on the display 14. In heads-up display 54 examples, the heads up display 54 may correspond to a standalone device that may be mounted or attached to a dashboard or console of the vehicle 42. In such examples, the heads-up display 54 may correspond to a pop-up display that may be selectively extended or retracted from a dashboard or instrument panel of the vehicle 42.

Figure 2:
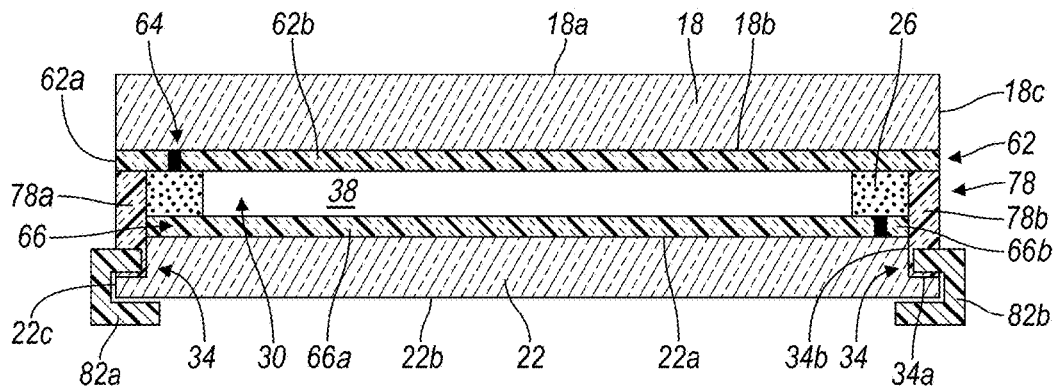
FIG. 2 is a cross-sectional view of the electro-optic element, according to at least one example.
Figure 3:
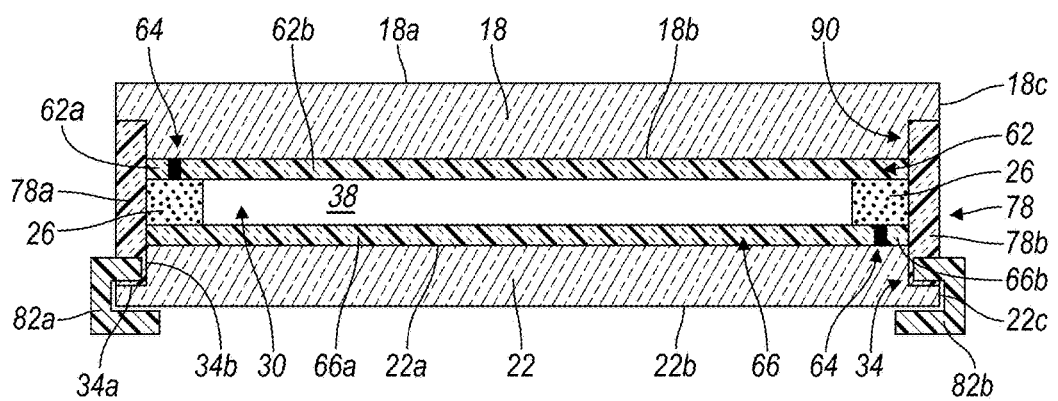
FIG. 3 is a cross-sectional view of the electro-optic element, according to at least one example.

Referring now to FIG. 2, in the depicted example, the electro-optic element 10 includes the first and second substrates 18, 22. The first and/or second substrates 18, 22 may be composed of a substantially transparent material such as glass (e.g., soda lime glass), a polymeric material (e.g., acrylic and/or polycarbonate), or combinations thereof. The first substrate 18 may have a thickness of less than or equal to about 2.2 mm, 2.0 mm, 1.6 mm, 1.5 mm, 1.2 mm, 1.0 mm, or 0.4 mm. The first substrate 22 may take a variety of shapes including square, rectangular, circular, oblong and combinations thereof. According to various examples, the first and/or second substrates 18, 22 may have a curvature across the length or width (i.e., a vertical or horizontal axis). In the depicted example, positioned on the second and third surfaces 18B, 22A are respective first and second electrically conductive layers 62, 66. The first and second electrically conductive layers 62, 66 may include a transparent conductor such as a transparent metal oxide (e.g., indium-tin-oxide, F:SnO$_2$, ZnO, IZO), carbon (graphene and/or graphite) and/or a conductive metal mesh (e.g., nanowires). In indium-tin-oxide examples, the first and second electrically conductive layers 62, 66 may have a sheet resistance of between about 1 ohms/sq and about 100 ohms/sq. The first and second electrically conductive layers 62, 66 may each define an isolation area 64 (FIG. 3). The isolation area 64 of the first electrically conductive layer 62 separates the first electrically conductive layer 62 into a first portion 62A and a second portion 62B. The first and second portions 62A, 62B may be electrically isolated from one another. The isolation area 64 of the second electrically conductive layer 66 separates the second electrically conductive layer 66 into a third portion 66A and a fourth portion 66B which may be electrically isolated from one another. According to various examples, a spectral filter, or chrome ring, may be utilized to obscure the isolation area 64 and/or channels and buses as described in greater detail below.

Figure 4:
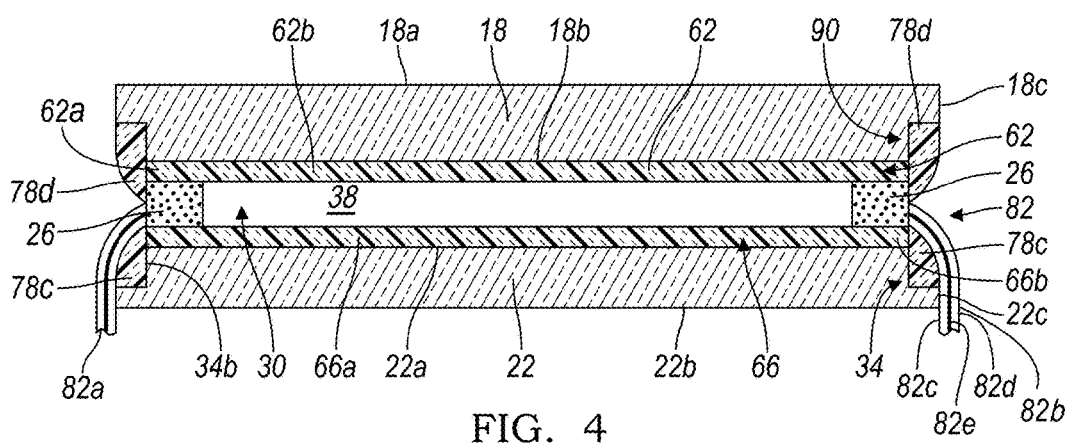
FIG. 4 is a cross-sectional view of the electro-optic element, according to at least one example.

The first and second substrates 18, 22 can be positioned in a parallel relationship and sealed around the perimeter using the primary seal 26 to define the cavity 30 (FIG. 4). The seal 26 extends around the second and third surfaces 18B, 22A to confine the electro-optic material 38 between the first and second substrates 18, 22. The seal 26 may be positioned proximate to, or in contact with, the isolation areas 64. Additional information related to forming a seal between a first and second substrate can be found in U.S. Pat. No. 5,790,298, entitled "METHOD OF FORMING OPTICALLY TRANSPARENT SEAL AND SEAL FORMED BY SAID METHOD," which is hereby incorporated herein by reference in its entirety. The cavity 30 may have a spacing between the first and second substrates 18, 22 of less than or equal to about 100 µm, 90 µm, 75 µm, 50 µm, 40 µm 35 µm, or less than or equal to about 20 µm. In a specific example, the spacing may be between about 20 µm and about 75 µm.

According to one example, the electro-optic element 10 may be a liquid crystal device, including a liquid crystal medium (e.g., the electro-optic material 38), configured to attenuate light transmitted through the electro-optic element 10 and/or display 14. In another example, the electro-optic element 10 may be a suspended particle device. In yet another example, the electro-optic element 10 may be an electrochromic element. In such an example, the electro-optic material 38 of the electro-optic element 10 is an electrochromic medium which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" may mean a material that undergoes a modification in its oxidation state upon exposure to a particular electrical potential difference. Additionally, it will be understood that the term "electrochromic" may mean, regardless of its ordinary meaning, a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Patent Application Publication No. 2002/0015214 A1 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety. According to various examples, the electro-optic element 10 may be configured to fail in a transparent state such that in the event of failure, the display 14 may still be usable. Use of electrochromic examples of the electro-optic element 10 may be advantageous because electrochromics may have a very wide gray scale. Further, the gray scale of the electrochromics may be angle independent such that the perceived darkening of the electro-optic element 10 does not vary as a driver shifts their perspective of the display 14 and/or electro-optic element 10.

Still referring to FIG. 2, in the depicted example, the second edge 22C of the second substrate 22 is stepped to define the channel 34. In the depicted example, the second edge 22C of the second substrate 22 is stepped, or notched, in an inboard direction, or in a direction toward a center of the electro-optic element 10 to define the channel 34. In other words, the channel 34 of the second substrate 22 extends inwardly away from the second edge 22C. The channel 34 is defined proximate the third surface 22A, the primary seal 26 and/or the cavity 30.

In the depicted example, the stepped second edge 22C defines a first channel surface 34A and a second channel surface 34B which cooperate to define the channel 34, but it will be understood that the first and second channel surfaces 34A, 34B may be a single, unitary, surface (e.g., in curved, semi-circular, or irregular shaped channel 34). Further, the channel 34 may include more than two surfaces (e.g., three, four or greater than four surfaces). According to some examples, the first channel surface 34A may be longer than the second channel surface 34B such that the channel 34 is wider (e.g., in an inboard direction) than the channel 34 is tall (e.g., a distance into the thickness of the second substrate 22). According to other examples, the first channel surface 34A may be shorter than the second channel surface 34B such that the channel 34 is taller (e.g., a distance into the thickness of the second substrate 22) than the channel 34 is wide (e.g., in an inboard direction). The first channel surface 34A may have a width of greater than or equal to about 0.1 mm, 0.2 mm, 0.3 mm, 0.4 mm, 0.5 mm, 0.6 mm, 0.7 mm, 0.8 mm, 0.9 mm or greater than or equal to about 1.0 mm. The second channel surface 34B may have a height of greater than or equal to about 0.1 mm, 0.2 mm, 0.3 mm, 0.4 mm, 0.5 mm, 0.6 mm, 0.7 mm, 0.8 mm, 0.9 mm or greater than or equal to about 1.0 mm. It will be understood that the first and second channel surfaces 34A, 34B may have any combination of widths (e.g., less than about 0.1 mm or greater than about 1.0 mm) that will produce a cross-sectional area and/or volume which is desired. An interface between the first and second channel surfaces 34A, 34B may be at a right angle, may be defined by a radius, or may be an irregular shape. For example, the interface may be a radius such that first and second channels surfaces 34A, 34B are actually a single continuous surface. In examples, where there are greater than two channel surfaces, the surfaces may be arranged to form a step pattern (e.g., a plurality of smaller steps) within the channel 34 each having an interface which may be defined by an angle and/or a radius. Further, it will be understood that although depicted with substantially right angles, the interfaces between the third surface 22A, the second edge 22C and the channel surfaces 34A, 34B may have a radius or other shape to reduce stress concentration at the interfaces. Further, either or both of the first and second channel surfaces 34A, 34B may be chamfered.

In the depicted example, the channel 34 is continuous around the second edge 22C of the second substrate 22. It will be understood that the channel 34 may be discontinuous (e.g., composed of two of channels 34) around the second edge 22C. Further, the channel 34 may extend around only a portion of the second surface 22C of the second substrate 22. The first and second channel surfaces 34A, 34B may vary across the length of the channel 34. For example, one portion of the channel 34 may have a first cross-sectional area, and a second portion of the channel 34 may have a second cross-sectional area which is smaller, larger or the same (i.e., with different values of the first and second channel surfaces 34A, 34B than the first portion) as the first cross-sectional area.

An electrical bus 78 may be positioned within the channel 34. The electrical bus 78 may be formed from an electrically conductive material, conductive solder, a conductive epoxy (e.g., silver epoxy), a wire, an electrically conductive tab (e.g., a solid metal piece) or combinations thereof. In the depicted example, the electrical bus 78 includes a first bus portion 78A and a second bus portion 78B. The first and second bus portions 78A, 78B may be electrically connected or isolated from one another. The first bus portion 78A extends through the channel 34 and along the seal 26 to electrically contact the third portion 66A of the second electrically conductive layer 66 and the first portion 62A of the first electrically conductive layer 62. The second bus portion 78B extends through the channel 34 and next to the seal 26 to electrically contact the fourth portion 66B of the second electrically conductive layer 66 and the second portion 62B of the first electrically conductive layers 62. The first and second bus portions 78A, 78B each extend around a portion of a perimeter of the electro-optic element 10 within the channel 34. The first and second bus portions 78A, 78B may fully fill or partially fill the channel 34. In the depicted example, the bus portions 78A, 78B fully fill the channel 34 and are substantially flush, or planar with the first and second edges 18C, 22C. In other examples, the electrical bus portions 78A, 78B may only partially fill the channel 34 (e.g., proximate the first and second electrically conductive layers 62, 66). It will be understood that although depicted as flush with the channel 34, the electrical bus 78 may extend between the first and second electrically conductive layer 62, 66 (i.e., in an inboard direction) to increase the amount of electrical contact between the bus 78 and the first and second electrically conductive layers 62, 66. Further, in some examples, the electrical bus portions 78A, 78B are positioned within the channel 34 and extend substantially over the second edge 22C.

The electro-optic element 10 may include first and second electrical connections 82A, 82B. In the depicted example, the first and second electrical connections 82A, 82B are positioned within the first and second bus portions 78A, 78B of the electrical bus 78, respectively. It will be understood that the first and second electrical connections 82A, 82B may extend into the channel 34, or may be in contact with portions of the first and second bus portions 78A, 78B which are external to the channel 34. The first and second electrical connections 82A, 82B are configured to transmit electrical energy to the respective first and second bus portions 78A, 78B. In the depicted example, the first and second electrical connections 82A, 82B are configured as J-clips which wrap around the second edge 22C and extend onto the fourth surface 22B. It will be understood that the electrical connection 82 may take a variety of configurations, including wires, metallized films, and other electrically conductive materials as described in greater detail below. Use of the channel 34 may be advantageous in increasing the cross-sectional area and/or volume of the first and second bus portions 78A, 78B while maintaining a small cavity 30 spacing. Increasing the cross-sectional area and/or volume of the first and second bus portions 78A, 78B may be advantageous in decreasing a resistivity of the first and second bus portions 78A, 78B.

According to various examples, the second electrically conductive layer 66 may extend into the channel 34. For example, the second electrically conductive layer 66 may be applied (e.g., sputtering, chemical vapor deposition, electroplating, sprayed) onto the first and second channel surfaces 34A, 34B. Such an example may be advantageous in increasing the electrical connection between the conductive bus 78 and the second electrically conductive layer 66.

Referring now to FIG. 3, in the depicted example, the second substrate 22 defines the channel 34 and the first substrate 18 defines a second channel 90. The second channel 90 may have substantially the same dimensions as the channel 34 of the second substrate 22. Similarly to the second edge 22C of the second substrate 22, the first edge 18C of the first substrate 18 may be stepped, or notched, in an inboard direction toward a center of the electro-optic element 10 to define the second channel 90. In the depicted example, the first and second bus portions 78A, 78B extend upward into the second channel 90. The first bus portion 78A extends through the channel 34 and the second channel 90 to electrically contact the third portion 66A of the second electrically conductive layer 66 and the first portion 62A of the first electrically conductive layer 62. The second bus portion 78B extends through the channel 34 and the second channel 90 to electrically contact the fourth portion 66B of the second electrically conductive layer 66 and the second portion 62B of the first electrically conductive layers 62. The first and second bus portions 78A, 78B may fill or partially fill one or both of the channel 34 and the second channel 90. In the depicted example, the first and second bus portions 78A, 78B fill both the channel 34 and the second channel 90 such that the first and second bus portions 78A, 78B are substantially planar with both the first and second edges 18C, 22C. It will be understood that the first and second bus portions 78A, 78B may fill different proportions of the channel 34 and second channel 90. For example, the first bus portion 78A may be flush, or planar, with the first edge 18C, but not the second edge 22C, and the second bus portion 78B may be flush with the second edge 22C, but not the first edge 18C. Use of the second channel 90 may be advantageous in essentially doubling the volume through which the first and second bus portions 78A, 78B may extend. By utilizing the channel 34 and the second channel 90, the cross-sectional area of each may be reduced (i.e., because the total cross-sectional area for the first and second bus portions 78A, 78B may be spread across the channel 34 and second channel 90). It will be understood that the first electrically conductive layer 62 may be applied to the second channel 90 in a similar manner as described above in connection with the channel 34 and the second electrically conductive layer 66.

Referring now to FIG. 4, in the depicted example, each of the channel 34 and the second channel 90 include separate electrical buses 78. In the depicted example, a first electrical bus 78C is positioned in the first channel 34, and a second electrical bus 78D is positioned in the second channel 90. The first and second electrical buses 78C, 78D may be electrically isolated from one another. The first and second electrical buses 78C, 78D may extend around a perimeter of the electro-optic element 10 as a unitary structure or a discontinuous structure. Electrical isolation of the first and second electrical buses 78C, 78D may be accomplished via separation from one another, extending the seal 26 between the buses 78, or through use of the first and second electrical connections 82A, 82B as shown. In the depicted example, the first and second electrical connections 82A, 82B are depicted as a dual-coated film. In dual-coated film examples, the first and second electrical connections 82A, 82B may include a first conductive coating 82C and a second conductive coating 82D positioned on opposite sides of an insulator layer 82E. According to various examples, the first and second conductive coatings 82C, 82D may include a metallic or other conducive material. For example, the first and second conductive coatings 82C, 82D may include silver, gold, copper, aluminum, conductive metals, conductive metal alloys, and/or combinations thereof. The insulator layer 82E may include a polymeric or semiconductor material configured to electrically isolate the first and second conductive coatings 82C, 82D. The insulator layer 82E may include polyethylene, polypropylene, polyimide polymers, other insulating polymers which are flexible, and/or combinations thereof. The insulator layer 82E may be a polymeric film. The first and second conductive coatings 82C, 82D are each configured to carry electrical energy to one of the first and second electrical buses 78C, 78D. The dual coated film example of the first and second electrical connections 82A, 82B may be positioned between the first and second electrical buses 78C, 78D to both provide electrical energy and to insulate the first and second electrical buses 78C, 78D. Isolation of the first and second electrical connections 82C, 82D may allow for the elimination of the isolation areas 64 (FIG. 3).

Figure 5A:
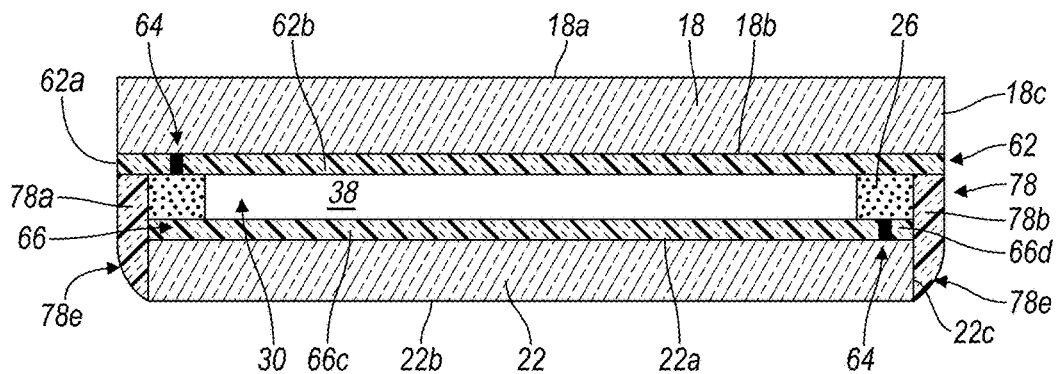
FIG. 5A is a cross-sectional view of the electro-optic element, according to at least one example.
Figure 5B:
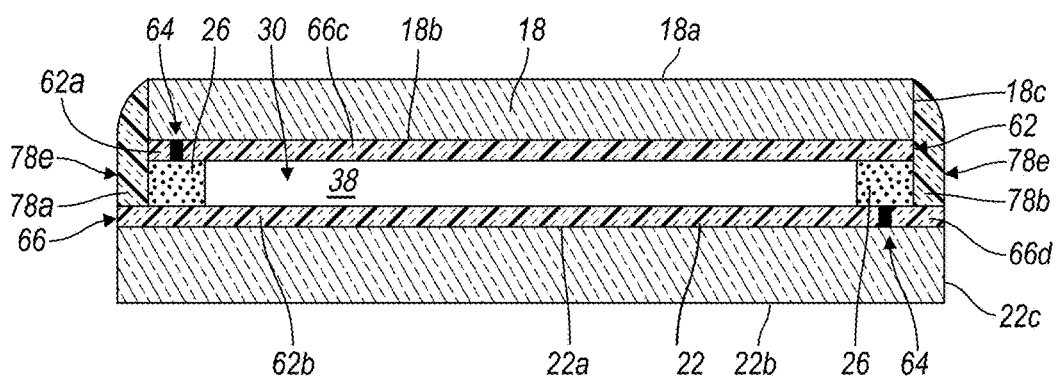
FIG. 5B is a cross-sectional view of the electro-optic element, according to at least one example.

Referring now to the depicted examples in FIGS. 5A and 5B, according to various examples, one of the first (FIG. 5A) and second (FIG. 5B) substrates 18, 22 may be wider, or longer, than the other. In such examples, the channel 34 (FIG. 2) and the second channel 90 (FIG. 3) may not need to be defined by the second and first substrates 22, 18, respectively. It will be understood that either substrate 18, 22 may still define the channel 34 or the second channel 90 without departing from the teachings provided herein. Further, the channel 34 and/or second channel 90 may instead be defined by the second or third surface 18B, 22A inboard of the first and second edges 18C, 22C. In such examples, the first and second bus portions 78A, 78B may extend along non-stepped examples of one of the first and second edges 18C, 22C. As depicted in FIG. 5A, the first substrate 18 is wider than the second substrate 22 such that an overhang by the first substrate 18 is created. In the depicted example of FIG. 5A, the first and second bus portions 78A, 78B extend from the first electrically conductive layer 62 and are in contact with the second edge 22C of the second substrate 22. In the depicted example of FIG. 5B, the second substrate 22 is wider than the first substrate 18. In such an example, the first and second bus portions 78A, 78B extend from the second electrically conductive layer 66 toward the first substrate 18 and make contact with the first edge 18C. In the depicted examples, the conductive buses 78 each define a curved exterior surface 78E (i.e., a curved shape). The curved exterior surfaces 78E curve inwardly (i.e., in an inboard direction) toward the electro-optic element 10 to define an aesthetically pleasing appearance. The curved exterior surfaces 78E may curve to intersect the fourth surface 22B (FIG. 5A) or to intersect the first surface 18A (FIG. 5B). It will be understood that the first and second electrical connections 82A, 82B (FIG. 3) may be electrically coupled with the first and second bus portions 78A, 78B as explained above. Use of the dimensionally mismatched first and second substrates 18, 22 may be advantageous in eliminating the use of the channel 34 and the second channel 90.

Figure 6:
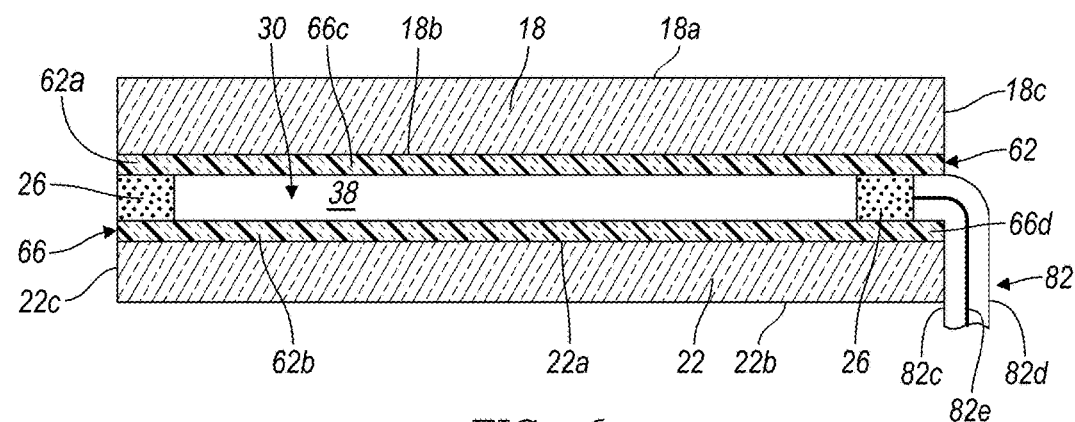
FIG. 6 is a cross-sectional view of the electro-optic element, according to at least one example.

Referring now to FIG. 6, the electro-optic element 10 may not include the electrical buses 78 (FIG. 5B), but may instead only include the dual film example of the first and second electrical connections 82A, 82B. In such an example, the first and second conductive coatings 82A, 82B may be sufficiently thick to contact the first and second electrically conductive layers 62, 66 without the use of the electrical buses 78. Such an example may be advantageous in reducing manufacturing time and cost associated with forming the channel 34 (FIG. 3), second channel 90 (FIG. 3) as well as the first and second bus portions 78A, 78B (FIG. 3). Further, small cavity 30 spacings may still be achieved.

Use of the present disclosure may offer a variety of advantages. First, utilizing the channel 34 and/or second channel 90 may allow for a larger cross-sectional area and/or volume to be achieved regardless of size or spacing of the cavity 30. As the size of the cavity 30 is decreased (i.e., as the distance between the first and second substrates 18, 22 is decreased) the area for the electrical bus 78 may be decreased, which may result in an increased resistance. Use of the channel 34 and/or second channel 90 may allow for an increased area for the electrical bus 78 such that the resistance is decreased while allowing a thinner cavity 30.

Second, use of the dual coated film examples of the first and second electrical connections 82A, 82B, with or without the channel 34 and/or second channel 90, may also allow for the thinning of the cavity 30. For example, the dual-coated film examples of the first and second electrical connections 82A, 82B may be able to fit between thin cavity 30 examples of the electro-optic element 10 where conventional electrical connections 82 (e.g., J-clips) may not be able to fit. Third, use of the present disclosure offers a flexibility in design of the electro-optic element 10 with respect to thickness and electrical connection. Fourth, use of the present disclosure may reduce a thickness of a chrome ring or spectral filter width.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. An electro-opticelement of a display of a vehicle, comprising:
   a first substantially transparent substrate defining a first surface and a second surface, wherein a first edge extends around the first substrate;
   a second substantially transparent substrate defining a third surface and a fourth surface, wherein a second edge extends around the second substrate;
   a primary seal disposed between the first and second substrates, the seal and the first and second substrates defining a cavity therebetween, wherein at least one of the first and second edges includes a stepped formation proximate the seal to define a channel;
   an electrical bus positioned within the channel; and
   an electro-optic material positioned within the cavity.

2. The electro-optic element of claim 1, wherein the second edge is stepped in an inboard direction to define the channel.

3. The electro-optic element of claim 1, wherein both the first and second edges are stepped to define the channel.

4. The electro-optic element of claim 3, further comprising:
   a first electrical bus positioned proximate the first stepped edge; and
   a second electrical bus positioned proximate the second stepped edge, wherein the first and second electrical buses are electrically isolated.

5. The electro-optic element of claim 4, wherein the seal is positioned between the first and second electrical buses.

6. The electro-optic element of claim 1, wherein the cavity has a spacing between about 20 μm and about 75 μm.

7. The electro-optic element of claim 1, wherein an electrical connection extends into the channel, the electrical connection comprises a polymeric film with a metallic coating.

8. The electro-optic element of claim 1, wherein an electrical connection extends into the channel and a thickness of the electrical connection is greater than a spacing of the cavity.

9. An electro-opticelement, comprising:
   a first substantially transparent substrate defining a first surface and a second surface, wherein a first edge extends around the first substrate;
   a second substantially transparent substrate defining a third surface and a fourth surface, wherein a second edge extends around the second substrate;
   a primary seal disposed between the first and second substrates, the seal and the first and second substrates defining a cavity therebetween, wherein the cavity has a thickness between the first and second substrates of less than about 75 μm and the second edge includes a stepped formation in an inboard direction to define a channel;

a conductive bus positioned within the channel and extending substantially over the second edge; and an electro-optic material positioned within the cavity.

10. The electro-optic element of claim 9, wherein the seal is positioned inboard of the channel.

11. The electro-optic element of claim 10, wherein the channel is wider than it is tall.

12. The electro-optic element of claim 10, wherein the channel is taller than it is wide.

13. The electro-optic element of claim 9, wherein the electro-optic material is an electrochromic material.

14. The electro-optic element of claim 9, wherein an electrical bus is positioned within the channel and extends substantially around the second substrate.

15. The electro-optic element of claim 9, wherein the first edge is stepped in an inboard direction such that the channel is defined by the first and second stepped edges and an electrical bus substantially fills the channel.

16. An electro-optic element, comprising:

a first substantially transparent substrate defining a first surface and a second surface, wherein a first edge extends around the first substrate;

a second substantially transparent substrate defining a third surface and a fourth surface, wherein a second edge extends around the second substrate, wherein the second edges is set inboard of the first edge to define a channel;

a conductive bus positioned within the channel, the conductive bus defining an exterior curved surface which substantially intersects the fourth surface;

a primary seal disposed between the first and second substrates, the seal and the first and second substrates defining a cavity therebetween; and an electro-optic material positioned within the cavity.

17. The electro-optic element of claim 16, wherein the conductive bus comprises a silver epoxy.

\* \* \* \* \*